Sept. 7, 1926.  1,599,353
F. L. ALBIN
VEHICLE TOWLINE DEVICE
Filed May 9, 1925
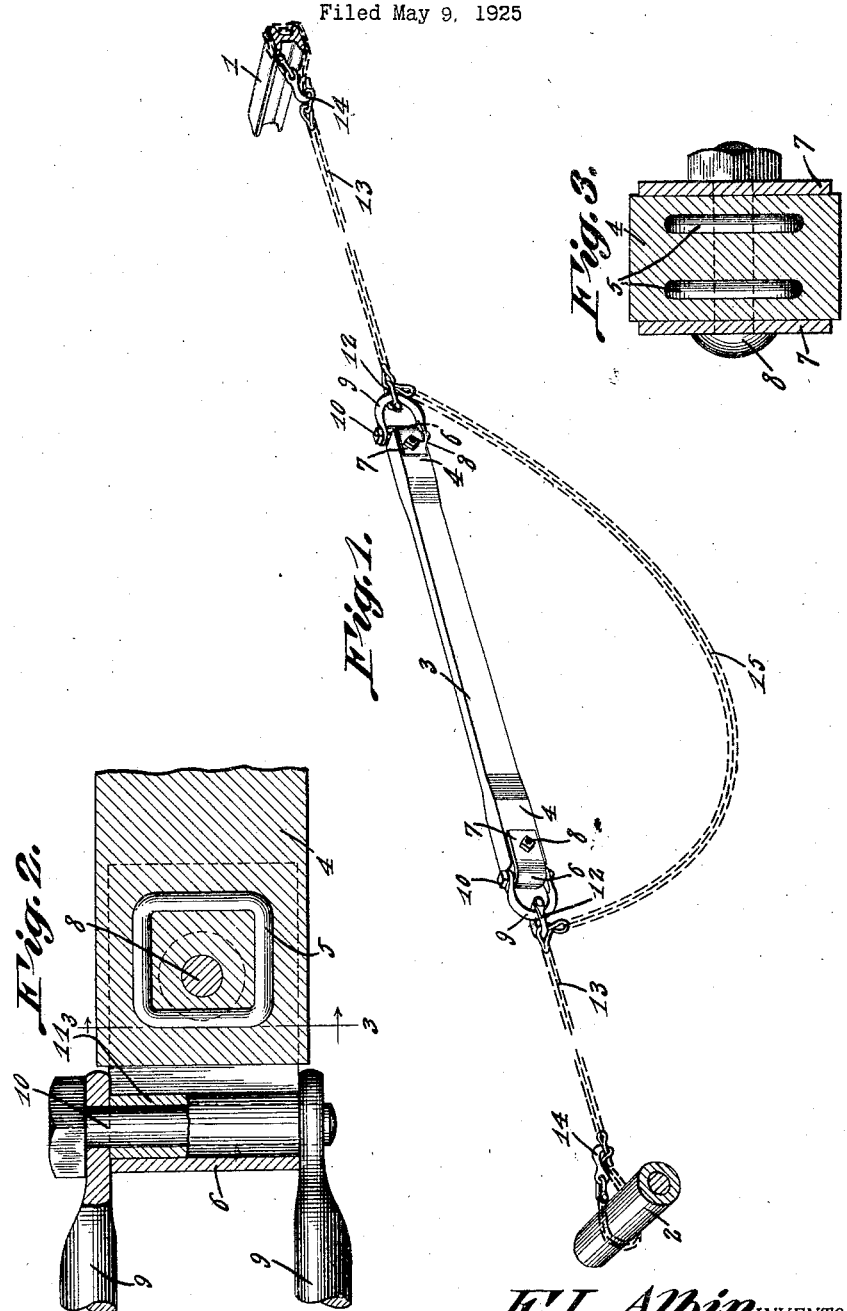
F. L. Albin, INVENTOR.
BY
Geo. P. Kimmel, ATTORNEY.

Patented Sept. 7, 1926.

1,599,353

UNITED STATES PATENT OFFICE.

FRED L. ALBIN, OF CASPER, WYOMING.

VEHICLE TOWLINE DEVICE.

Application filed May 9, 1925. Serial No. 29,159.

This invention relates to vehicle tow line devices and pertains particularly to a towing device having a certain amount of give or elasticity whereby sudden strains upon the tow line occurring in the body of the pulling vehicle and the vehicle being towed, will be taken up by the tow line instead of being thrown violently and quickly upon the axles of the connected vehicles.

The invention contemplates the provision of a heavy substantial body of rubber or combined rubber and fabric, which body is of substantial length and has a means whereby there may be secured to each end a section of chain. Connecting the ends of the rubber body is a safety chain, which is of materially greater length than the body and which serves to prevent the body from being strained to the breaking point.

A further object of this invention is the provision, in a manner as hereinafter set forth, of a vehicle tow line having an elastic shock absorbing body forming a part thereof, and having means imbedded in said body whereby the chains connected to the ends thereof will be prevented from ripping loose from the body.

A further and final object of the invention is the provision, in a manner as hereinafter set forth, of a vehicle tow line which will be strong, light and durable, not cumbersome or bulky to store, quick and easy to place into position and inexpensive to manufacture.

The invention will be best understood from a consideration of the following detailed description taken in connection with the accompanying drawing forming a part of this specification, with the understanding that the invention is not confined to any strict conformity with the showing of the drawing but may be changed and modified so long as such changes and modifications mark no material departure from the salient features of the invention as expressed in the appended claims.

In the drawing:—

Figure 1 is a perspective view of the line embodying this invention showing the position which same will assume when being used.

Figure 2 is a section taken upon the line 2—2 of Figure 1 showing a reinforcement element imbedded in the body.

Figure 3 is a transverse section taken upon the line 3—3 of Figure 2 for a further showing of the reinforcing element.

Referring now to the drawing in detail wherein like numerals of reference indicate corresponding parts throughout the several views, there is indicated by the numerals 1 and 2, a portion of a front and rear automobile axle.

The device embodying this invention comprises a relatively long, solid elastic strap of rubber or fabric reinforced rubber 3, each end of this strap being of increased thickness as indicated at 4 and in each of these ends of increased thickness there are embedded, side by side, a pair of metallic loop members or links 5.

Fitted over each of the ends 4 and bearing against the sides of the strap are substantially U-shaped metallic end coupling members 6, the arms 7 of which are clamped against the sides of the strap at the ends 4 by the securing bolts 8, which extend through the ends 4 of the strap and also through the embedded metallic loops 5 as indicated in Figures 2 and 3. The coupling members 6 project from the end edges of the strap 3.

Projecting from each of the members 6 is a pivoted clevis 9. The ends of the legs of each clevis 9 are mounted against the edges of a member 6, and the said ends are connected with the member 6 through the medium of a bolt 10 which extends through a sleeve 11 arranged within the projecting portion of the member 6. These sleeves as shown serve as roller devices and also prevent the bolts 10 from wearing through.

A relatively large link 12 is carried by each clevis 9 and each of the links 12 is permanently connected to a link of a coupling chain 13 of materially greater length than the length of the strap 3. The ends of the chain 13 carry thereon hook members 14 which, when the ends of the chain are passed about the axles as is shown in the drawing, engage one of the links of the chain to retain the same securely in position.

The links 12 connect at two spaced points of the chain 13 intermediate the ends thereof, and the portion of the chain 13 between the points of connection of the chain and the links 12, as indicated at 15, is of greater length than the length of the strap 3, and by this arrangement provision is made to permit of the stretching of the strap 3, then further after the strap 3 is stretched to a danger point the portion 15 of the chain will be drawn taut and will prevent the strap from breaking.

The tow line thus described really comprises a chain of substantial length having connected to the intermediate portion thereof the ends of an elastic strap 3 of less length than the intermediate portion of the chain to which it is connected, thus permitting the said intermediate portion to hang idle while the tow line is in use so long as the elastic strap 3 is of sufficient strength to carry any strain placed thereupon. In the event that the strain is too great for the elastic strap, as above described, the intermediate portion 15 of the chain will then be drawn taut and will come into play to prevent the breakage of the strap 3.

From the foregoing description it will be readily seen that there has been provided a tow chain of improved construction, which, when in use will be exceptionally valuable in that sudden severe strain which may be brought thereupon the axles of the connected vehicles will be greatly relieved by the giving of the elastic body 3 forming the intermediate portion of the tow chain.

Having thus described my invention what I claim is:

1. A tow line comprising a solid elastic strap, a coupling chain of materially greater length than the length of the strap, and a pivoted coupling device projecting from each end of the strap, the said coupling devices permanently connected at two spaced points to said chain intermediate its ends, that portion of the chain between the said two points of connection being of greater length than the length of the strap to permanently provide slack in the chain to compensate for stretching of the strap.

2. In a tow line a solid elastic strap of substantial length for association with a coupling chain, said strap having projecting from each end a pivoted coupling device for connection with a link of the coupling chain.

3. In a tow line a solid elastic strap for association with a coupling chain and provided with end terminal portions of greater thickness than the intermediate portion of the strap, metallic reinforcing elements embedded in said end terminal portions, a pivoted coupling device projecting from each end terminal portion of said strap for connection with a link of the coupling chain, and means extending through said end terminal portions and the metallic reinforcements therein for securing said devices to the end terminal portions of the strap.

4. In a tow line a solid elastic strap for association with a coupling chain, metallic reinforcing members embedded in each end of the strap, coupling members overlapping each end of the strap, means extending through said members and through said reinforcements for clamping said members against the sides of the strap, and a clevis pivotally connected with each of said members and provided with means for connecting it to a link of the coupling chain.

5. In a tow line a solid elastic strap for association with a coupling chain, a coupling member clamped to and projecting from each end of said chain, a clevis mounted against the top and bottom edges of each member and projecting therefrom, a sleeve arranged between each member and the end edge of the strap, bolts extending through the inner end of said clevises and through said sleeves for pivotally connecting the clevises to said member, and means carried by each clevis for connecting it with a link of the coupling chain.

In testimony whereof, I affix my signature hereto.

FRED L. ALBIN.